Figure 1:
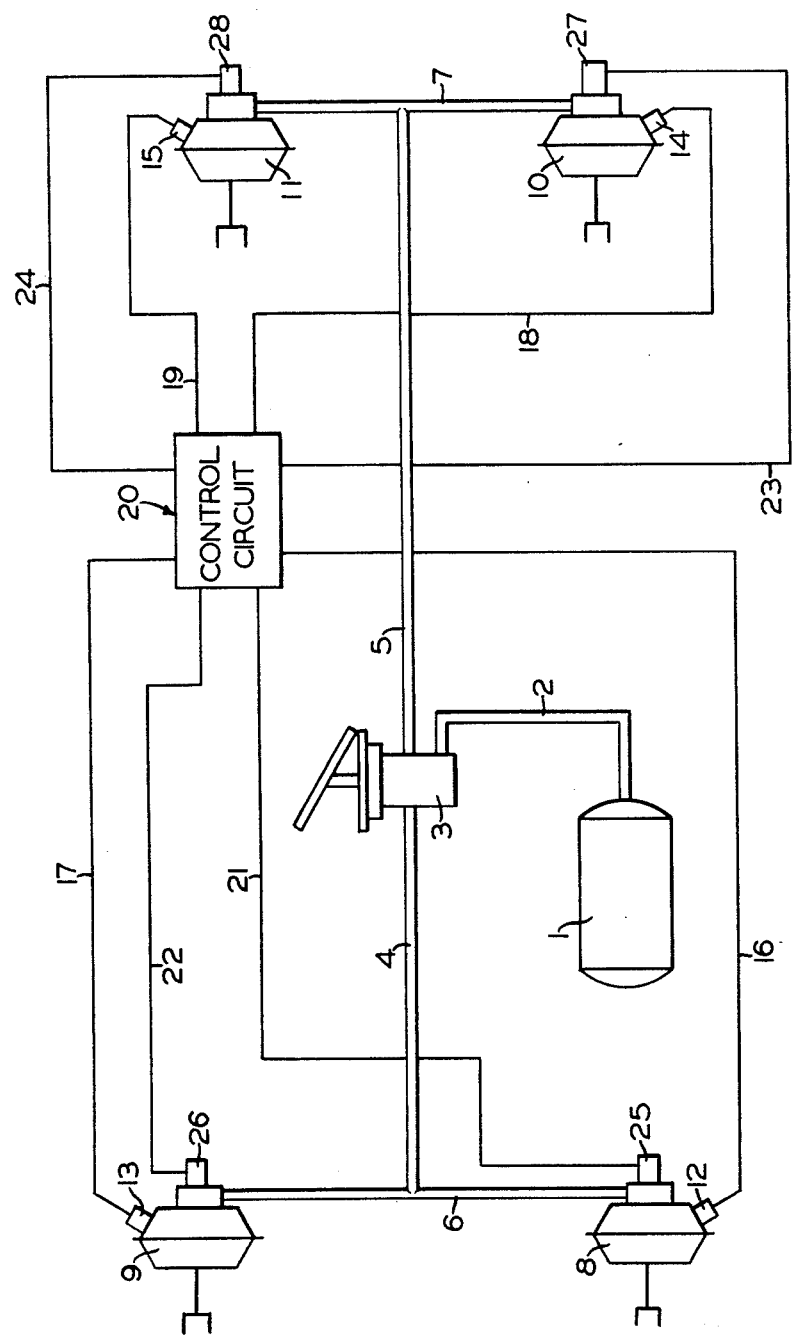

United States Patent [19]
Reinecke

[11] 3,988,043
[45] Oct. 26, 1976

[54] INDIVIDUAL WHEEL ANTI-SKID BRAKE CONTROL SYSTEM EMPLOYING ELECTRONIC COMPARISON AND BRAKE PRESSURE DIFFERENTIAL LIMITING CIRCUITRY

[75] Inventor: Erich Reinecke, Beinhorn, Germany
[73] Assignee: WABCO Westinghouse GmbH, Hannover, Germany
[22] Filed: Nov. 13, 1975
[21] Appl. No.: 631,505

[30] Foreign Application Priority Data
Dec. 20, 1974 Germany............................ 2460309

[52] U.S. Cl................................. 303/21 A; 303/20
[51] Int. Cl.².......................................... B60T 8/04
[58] Field of Search........................... 303/21 A, 20

[56] References Cited
UNITED STATES PATENTS
| | | | |
|---|---|---|---|
| 3,796,468 | 3/1974 | Morse | 303/20 |
| 3,866,981 | 2/1975 | Klatt | 303/21 A |
| 3,918,767 | 11/1975 | Reinecke | 303/21 A |

Primary Examiner—Trygve M. Blix
Assistant Examiner—Reinhard J. Eisenzopf
Attorney, Agent, or Firm—R. W. McIntire, Jr.

[57] ABSTRACT

An electronic anti-skid brake control system for regulating an individual wheel brake pressure independently of an operator controlled brake valve device in such a manner that when a predetermined brake pressure difference between a skidding and non-skidding wheel arises, the higher wheel brake pressure of the non-skidding wheel is reduced. Pressure transducers produce an electrial signal representative of each wheel brake pressure. These signals are connected to different inputs of a pair of differential amplifiers, which algebraically sum the signals to provide different polarity output signals according to the difference in wheel brake pressure. These difference signals are then compared at operational amplifiers with a predetermined bias signal that establishes the differential pressure at which at least one operational amplifier is operated to control modulator valve means associated with the non-skidding wheel.

6 Claims, 2 Drawing Figures

INDIVIDUAL WHEEL ANTI-SKID BRAKE CONTROL SYSTEM EMPLOYING ELECTRONIC COMPARISON AND BRAKE PRESSURE DIFFERENTIAL LIMITING CIRCUITRY

BACKGROUND OF THE INVENTION

The present invention is concerned with automotive brake control systems of the type wherein each individual wheel is provided with anti-skid brake control means. Such individual wheel anti-skid control arrangements are well known to provide for the shortest possible stopping distance since each wheel brake pressure is predicated upon the available adhesion between the roadway and that particular wheel. However, a disadvantage of systems employing individual wheel anti-skid control is that of disproportionate brake forces arising on different wheels, such as the steering wheels, for example. This is known to cause sudden swerving when the one wheel on one side of the vehicle encounters a slippery (low adhesion) area of the roadway, while the other wheel is running on a dry (high adhesion) surface. The impending wheel skid of the one wheel is sensed by the anti-skid control system which accordingly operates to relieve braking pressure at the one wheel independently of the other wheel to produce the above-mentioned disproportionate brake forces. On vehicles with short wheel bases praticularly, loss of vehicle control may result due to a panic reaction of the operator in attempting to counter steer the vehicle against the direction of yaw brought about by the disproportionate brake forces.

The above discussed problem can be overcome by controlling each wheel according to the dynamic characteristics of the wheel running on the poorer road surface, in other words, the wheel which first experiences an impending skid. This, however, prevents the wheel running on the better road surface from realizing optimum brake torque. Consequently, vehicle stopping distance is compromised in favor of improved steering stability.

In the event the coefficient of friction of the roadway is capable of supporting only minimal braking torque before an impending wheel skid condition arises, the increased stop distance resulting may be such as to create a safety hazard itself, even though improved steering is obtained.

There has been disclosed in U.S. patent application, Ser. No. 457,819, now U.S. Pat. No. 3,918,767, a system of individual wheel anti-skid brake control wherein the brake pressure of a pair of wheels, such as the vehicle steering wheels, is compared and the brake pressure of the wheel having the higher braking pressure is held constant or reduced only when the brake pressure difference between the wheels exceeds a predetermined value. As compared to the above-mentioned system, this pressure difference limiting arrangement permits realization of substantially normal stop distances, while still providing good steering stability.

The comparison of the wheel brake pressures is carried out by a differential pressure switch having an actuating piston subject opposingly to the different wheel brake pressures. The actuating piston is spring biased in a neutral position in which an electrical armature on the actuating piston is positioned between two spaced-apart electrical contacts. The spring bias on the actuating piston establishes a differential pressure setting at which one or the other electrical contacts are engaged by the armature for the purpose of energizing a modulator valve associated with the wheel having the higher braking pressure.

This last-mentioned arrangement has the disadvantage of losing its accuracy over a period of time due to wear on the force transmitting structural parts and fatigue of the bias springs embodied by the differential pressure switch.

SUMMARY OF THE INVENTION

It is therefore the object of the present invention to provide an anti-skid brake control system of the type mentioned, which is further distinguished by an extended, maintenance free service life, during which operational reliability and integrity of the differential pressure limit setting is provided.

An additional object of the invention is to accomplish the above objective with a minimum of expenditure and a minimum space requirement.

These objectives are fulfilled through the present invention by providing an electric pressure measuring device for sensing each wheel brake pressure and an electronic comparison and control system for operating one of the individual wheel modulator valves in parallel with the conventional wheel evaluation control circuits of the anti-skid brake control system, depending upon which wheel brake pressure is detected as being greater than the other wheel brake pressure by a preselected amount.

Figure 2:
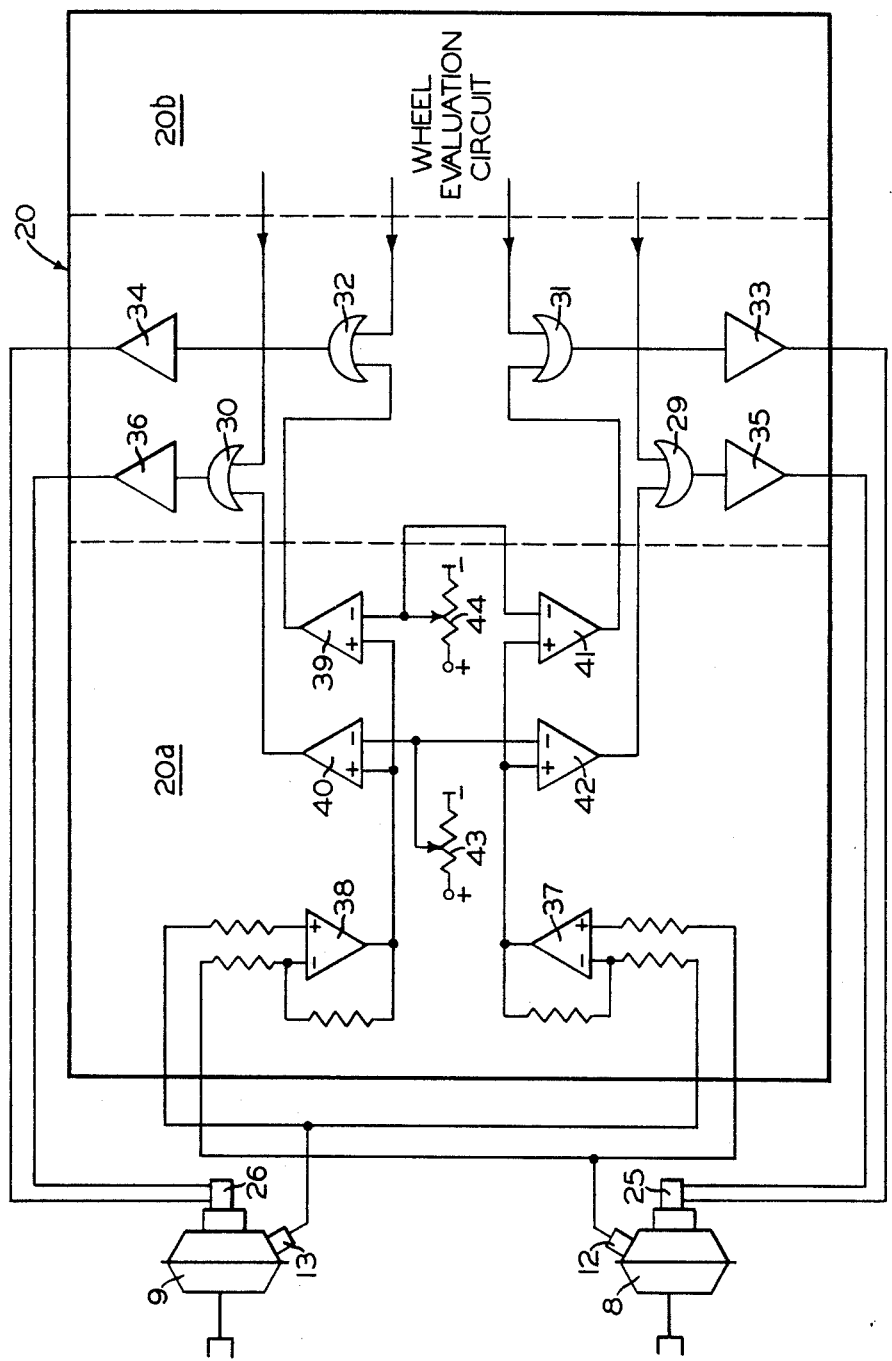

These objectives and other advantages of the present invention will become apparent from the following description when taken with the accompanying drawings of which:

FIG. 1 is a block diagram of an anti-skid brake control system embodying the differential pressure limiting system of the invention; and FIG. 2 is a schematic of the differential pressure limiting portion of FIG. 1.

DESCRIPTION AND OPERATION

Referring to FIG. 1, there is shown a typical automotive type individual wheel anti-skid brake control system including a fluid pressure storage reservoir 1 from which a supply line 2 connects supply fluid pressure, such as compressed air to an operator controlled brake valve device 3. Brake lines 4, 5, 6 and 7 connect the brake valve device 3 to the brake cylinder devices 8, 9, 10 and 11 associated with the respective wheels of the vehicle. Arranged on the respective wheel brake cylinder devices are pressure transducers 12, 13, 14 and 15 for providing an instantaneous readout in the form of an electrical quantity, the degree of brake cylinder pressure developed. Wires 16, 17, 18 and 19 connect the respective electrical signals representing brake cylinder pressure to a control circuit 20 of which an electronic comparison circuit 20a comprising the improvement of the present invention is a part. Output signals generated by control circuit 20 are connected via wires 21, 22, 23 and 24 to the respective wheel modulator valves 25, 26, 27 and 28. Typically, these modulator valves eachh comprise an electro-magnetic supply valve and exhaust valve, which regulate the operator controlled fluid brake pressure delivered via brake valve device 3.

The electronic comparison circuit 20a comprising the improvement constituting the present invention is shown in FIG. 2 of the drawings, which may also include a conventional wheel evaluation circuit 20b.

Outputs of these separate control circuits are connected in parallel with the respective wheel modulator valves (only two wheels are shown in FIG. 2) via OR gates 29, 30, 31 and 32 and amplifiers 33, 34, 35 and 36.

Included in electronic comparison circuit 20a are differential amplifiers 37 and 38, each having a different input connected to the transducers 12, 13 of the respective wheel brake cylinder devices 8, 9. An electrical voltage proportional to the brake pressure effective at brake cylinder 8 is registered at the positive input of differential amplifier 37 and at the negative input of differential amplifier 38, while an electrical voltage proportional to the brake pressure effective at brake cylinder 9 is registered at the positive input of differential amplifier 38 and at the negative input of differential amplifier 37. The output of differential amplifier 37 thus reflects the brake pressure difference arising when the pressure in brake cylinder 8 is greater than the pressure in brake cylinder 9 and when the opposite condition arises, the brake pressure difference is reflected in the output of differential amplifier 38. Also included in comparison circuit 20a are conventional operational amplifiers 39 and 40 having their non-inverting inputs connected to the output of differential amplifier 38, and operational amplifiers 41 and 42 having their non-inverting inputs connected to the output of differential amplifier 37. The outputs of operational amplifiers 42 and 40 are connected to the respective wheel modulator valves 25 and 26 via OR gates 29, 30 and amplifier 35, 36 in order to control the modulator valve supply valves, while similarly, the outputs of operational amplifiers 41 and 39 are connected to the respective wheel modulator valves 25 and 26 to control the exhaust valves thereof. Also, connected to the inverting inputs of operational amplifiers 42 and 40 is a potentiometer 43, while a potentiometer 44 is connected to the inverting inputs of operational amplifiers 39 and 41. Potentiometer 43 therefore establishes the maximum pressure difference limit between brake cylinder devices 8 and 9, at which differential either operational amplifier 40 or 42 operates to energize the electro-magnetic supply valve of the brake cylinder device having the greater pressure, thereby terminating further supply of operator controlled fluid brake pressure to this brake cylinder device. Similarly, potentiometer 44 establishes the brake cylinder pressure differential at which the electro-magnetic exhaust valve of the brake cylinder 8 or 9 having the greater pressure is energized to vent the brake pressure thereat.

Assume now, for the purpose of explaining the operation of the invention, that the brake cylinder devices 8 and 9 are associated with the steering wheels of a vehicle. During a brake application initiated through the operator controlled brake valve 3, compressed air is passed from storage reservoir 1 to the wheel brake cylinders 8, 9, 10 and 11 via supply line 2 and brake lines 4, 5, 6 and 7. Conventional anti-skid brake control equipment (not shown) monitors the wheel behavior of each wheel and signals the wheel evaluation circuit 20b when a respective wheel is in an impending skid condition. If the right wheel is running on a road surface having a relatively low coefficient of friction, while the surface on which the left wheel is running exhibits a high coefficient of friction, for example, it can be assumed that the right wheel will exhibit a tendency to skid ahead of the left wheel. This skidding tendency will be sensed and the wheel evaluation control circuit will accordingly energize the electro-magnetic supply and exhaust valves comprising modulator valve 26 of the right wheel brake cylinder 9. The supply valve cuts off further supply of fluid brake pressure to brake cylinder 9 via the operator controlled brake valve 3, while the exhaust valve concurrently vents the pressure in brake cylinder device 9. Accordingly, a brake pressure differential arises between the left and right wheel brake cylinders 8 and 9, which is monitored by the respective transducers 12 and 13 to produce a voltage corresponding to the brake pressure prevailing in each brake cylinder 8 and 9.

The transducer voltage corresponding to the brake pressure prevailing in brake cylinder 8 of the left wheel is effective at the negative terminal of differential amplifier 38 and at the positive terminal of differential amplifier 37, while the transducer voltage corresponding to the right wheel brake pressure is effective at the positive terminal of differential amplifier 38 and at the negative terminal of differential amplifier 37. Differential amplifiers 37 and 38 function to algebraically sum the voltage values at the positive and negative amplifier input terminals. It follows, therefore, that since the left wheel brake pressure is greater than the right wheel brake pressure, due to the anti-skid brake control system acting to effect a reduction of the right wheel brake pressure in response to the impending skid condition thereof, a positive output voltage exists at differential amplifier 37 associated with the left wheel brake cylinder device 8, while differential amplifier 38 associated with the right wheel brake cylinder device 9 emits a negative voltage when the positive voltage emitted by differential amplifier 37 exceeds the threshold value set by the bias voltage of potentiometer 43, operational amplifier 42 will provide an output signal to energize and accordingly close the electro-magnetic supply valve comprising modulator valve 25 of the left wheel brake cylinder to prevent any further increase in the left wheel brake pressure. Since the output of differential amplifier 38 is of negative polarity, the bias voltage at operational amplifier 40 will prevent this amplifier from producing an output and the right wheel brake pressure will continue to be regulated by the wheel evaluation control circuit. Depending upon the right wheel brake pressure, this action may be sufficient to withhold any further increase in the brake pressure difference between the respective wheels.

However, the right wheel brake pressure may still be exhausting under control of the wheel evaluation circuit, whereby the further reduction of brake pressure at the right wheel brake cylinder device 9 will result in the brake pressure difference between the left and right wheels continuing to increase, even though the supply of brake pressure to brake cylinder device 8 has been terminated, as above explained. When the brake pressure difference subsequently exceeds a threshold value set by the bias voltage provided by potentiometer 44, operational amplifier 41 will become operative to energize the electro-magnetic exhaust valve comprising modulator valve 25 of the left wheel brake cylinder to effect a reduction of the left wheel brake pressure and accordingly maintain a constant pressure differential between the respective wheels. In this manner, the pressure differential between these steering wheels is prevented from reaching a value sufficient to cause the vehicle to pull to either side excessively.

Upon cessation of the impending skid condition of the right wheel, the anti-skid brake control will terminate and the operator controlled brake pressure supplied via brake valve 3 is reestablished via the supply valve comprising modulator valve 26. The pressure differential between the left and right wheels accordingly diminishes, first causing the exhaust valve and then the supply valve comprising modulator valve 25 to be deenergized. This results in the reapplication of brake pressure to the left wheel brake cylinder device via brake valve device 3. Both wheel brake pressures are thus under control of the operator until a further impending wheel skid condition occurs.

Should the left wheel subsequently encounter a section of roadway having a relatively low coefficient of friction, so as to exhibit a wheel skid tendency, the wheel evaluation control circuit will respond to effect energization of modulator valve 25 of the left wheel brake cylinder 8. The resulting brake pressure difference between the left and right wheels will cause the comparison circuit 20a of control circuit 20 to again respond when the difference exceeds a preselected value. In this instance, however, the comparison circuit will recognize the right wheel as having the higher brake pressure and will accordingly operate through differential amplifier 38, operational amplifiers 39, 40, OR gates 30, 32 and output amplifiers 34, 36 to operate the right wheel modulator valve 26 to influence the right wheel brake pressure to the extent necessary to limit the brake pressure difference between the respective wheels.

Being electronic in character, the comparison circuit 20a thus takes up only a minimum of space while reliably performing the required function of limiting the brake pressure difference between selected wheels of a vehicle over an extended service life.

Having now described the invention what I claim as new and desire to secure by Letters Patent, is:

1. An anti-skid brake control system for a vehicle having independently rotatable wheels comprising:
   a. a fluid pressure actuated brake cylinder device for each wheel;
   b. a storage reservoir charged with fluid under pressure;
   c. an operator controlled brake valve device for controlling the supply of fluid under pressure from said storage reservoir to each of said brake cylinder devices;
   d. modulator valve means for regulating a respective wheel brake pressure independently of said brake valve device;
   e. wheel evaluation means for effecting operation of said modulator valve means of a skidding wheel in such sense as to reduce the brake pressure thereat;
   f. comparison means for comparing one wheel brake pressure with another wheel brake pressure and accordingly providing a control signal to effect operation of said modulator valve means of the wheel having the greater brake pressure, wherein the improvement comprises:
   g. a transducer for converting each wheel brake pressure to a corresponding electrical signal;
   h. said comparison means including:
      i. first and second differential amplifier means having a positive input terminal subject to said electrical signal from said transducer of one wheel and a negative input terminal subject to said electrical signal from said transducer of the other wheel for producing an output signal according to the algebraic summation of said signals at said input terminals indicative of the difference in brake pressure between said one and said other wheel, the polarity of said output signals differing depending upon which wheel brake pressure is the greater and which is the lesser;
      ii. first signal level detector means subject to said output signal from said first differential amplifier means for providing said control signal when said first differential amplifier output signal exceeds a predetermined threshold;
      iii. second signal level detector means subject to said output signal from said second differential amplifier means for providing said control signal when said second differential amplifier output signal exceeds a predetermined threshold;
      iv. bias means for establishing said predetermined threshold at which said first and second signal level detector means operate to provide said control signal.

2. The anti-skid brake control system as recited in claim 1, further characterized in that said modulator valve means comprises an electro-magnetic supply valve operative responsive to said control signal for interrupting the supply of fluid pressure from said brake valve device to said brake cylinder device having the greater brake pressure.

3. The anti-skid brake control system as recited in claim 2, wherein said modulator valve means further comprises an electro-magnetic exhaust valve operative responsive to said control signal for relieving said brake pressure at said brake cylinder device having the greater braking pressure.

4. The anti-skid brake control system as recited in claim 1, further characterized in that said bias means comprises a potentiometer to establish said predetermined threshold.

5. An anti-skid brake control system for a vehicle having independently rotatable wheels comprising:
   a. a fluid pressure actuated brake cylinder device for each wheel;
   b. a storage reservoir charged with fluid under pressure;
   c. an operator controlled brake valve device for controlling the supply of fluid under pressure from said storage reservoir to each said brake cylinder device;
   d. electro-magnetic supply and exhaust valve means for regulating an individual wheel brake cylinder pressure by interrupting the supply of fluid brake pressure thereto and releasing brake pressure therefrom respectively independent of said brake valve device;
   e. wheel evaluation means for controlling operation of said supply and exhaust valve means to effect a reduction of brake cylinder pressure at a skidding wheel;
   f. transducer means for converting each wheel brake pressure to a corresponding electrical signal;
   g. comparison means subject to the electrical signals from said transducer means for providing a first control signal to operate said supply valve means when the brake pressure of one wheel differs from the brake pressure of another wheel by a first predetermined amount and for providing a second control signal to operate said exhaust valve means when said one and said another wheel brake pressure differ by a second predetermined amount, said comparison means comprising:

i. a first and second differential amplifier each having a positive input terminal connected to said transducer of said one wheel and a negative input terminal connected to said transducer of said another wheel for producing opposite polarity output signals whose magnitude is determined by the algebraic summation of the signals at said input terminals indicative of the difference in brake pressure between said one and said another wheel;

ii. a first and a second operational amplifier each having a non-inverting input connected to the output of said first differential amplifier;

iii. a third and fourth operational amplifier each having a non-inverting input connected to the output of said second differential amplifier;

iv. a first potentiometer connected to an inverting input of said first and third operational amplifiers to establish a first predetermined threshold at which either said first or said third operational amplifier is operative to provide said first control signal; and v. a second potentiometer connected to an inverting input of said second and said fourth operational amplifier to establish a second predetermined threshold at which either said second or said fourth operational amplifier is operative to provide said second control signal.

6. The anti-skid brake control system recited in claim 5, further characterized in that said second predetermined threshold represents a difference in brake pressure greater than said first predetermined threshold.

* * * * *